(12) United States Patent
Xia

(10) Patent No.: US 11,919,770 B2
(45) Date of Patent: Mar. 5, 2024

(54) NANO-SULFUR CONTAINING COMPOSITION AND APPLICATION THEREOF

(71) Applicant: Suzhou Canastar New-Materials Technology Corporation, Jiangsu (CN)

(72) Inventor: Kui Xia, Jiangsu (CN)

(73) Assignee: SUZHOU CANASTAR NEW-MATERIALS TECHNOLOGY CORPORATION, Jiangsu (CN)

( * ) Notice: Subject to any disclaimer, the term of this patent is extended or adjusted under 35 U.S.C. 154(b) by 0 days.

(21) Appl. No.: 17/533,772

(22) Filed: Nov. 23, 2021

(65) Prior Publication Data

US 2022/0081294 A1    Mar. 17, 2022

Related U.S. Application Data

(63) Continuation of application No. 16/627,842, filed as application No. PCT/CN2018/099661 on Aug. 9, 2018, now abandoned.

(30) Foreign Application Priority Data

Aug. 10, 2017    (CN) .......................... 201710679091.X

(51) Int. Cl.
  *C01B 17/02*    (2006.01)

(52) U.S. Cl.
  CPC ...... *C01B 17/0248* (2013.01); *C01P 2004/64* (2013.01)

(58) Field of Classification Search
  None
  See application file for complete search history.

(56) References Cited

U.S. PATENT DOCUMENTS

| | | | |
|---|---|---|---|
| 2,201,124 A | 5/1940 | Ehman | |
| 5,278,208 A | 1/1994 | Palmer et al. | |
| 10,321,681 B2 | 6/2019 | Grobler | |
| 2013/0330619 A1 | 12/2013 | Archer | |
| 2013/0338367 A1 | 12/2013 | Numata | |
| 2014/0030578 A1 | 1/2014 | Hoshiba | |
| 2014/0274691 A1 | 9/2014 | Thompson | |
| 2014/0287919 A1 | 9/2014 | Levine | |
| 2015/0349323 A1 | 12/2015 | Manthiram | |
| 2017/0047581 A1* | 2/2017 | Lu ........................ | H01M 4/1395 |
| 2017/0188580 A1 | 7/2017 | Kuwahara | |
| 2017/0207488 A1* | 7/2017 | Zhamu .................. | H01M 4/139 |

FOREIGN PATENT DOCUMENTS

| | | | |
|---|---|---|---|
| CN | 1453205 A | | 11/2003 |
| CN | 1757603 A | | 4/2006 |
| CN | 1821082 A | | 8/2006 |
| CN | 101234752 A | | 8/2008 |
| CN | 101841036 | * | 9/2010 |
| CN | 101880031 | * | 11/2010 |
| CN | 101880031 A | | 11/2010 |
| CN | 103500813 | | 1/2014 |
| CN | 104143624 | * | 11/2014 |
| CN | 104195589 A | | 12/2014 |
| CN | 104627966 | | 2/2015 |
| CN | 104638251 | | 2/2015 |
| CN | 104795544 | | 4/2015 |
| CN | 104944381 A | | 9/2015 |
| CN | 105708770 A | | 6/2016 |
| CN | 106921000 | * | 7/2017 |
| DE | 1717019 B1 | | 4/1972 |
| EP | 3011616 | * | 6/2014 |
| GB | 411241 A | | 6/1934 |
| GB | 465574 A | | 5/1937 |
| JP | S63165308 A | | 7/1988 |
| KR | 20130073766 | | 7/2013 |
| KR | 101322483 | | 10/2013 |
| WO | 2017036522 | * | 3/2017 |

OTHER PUBLICATIONS

Office Action in related Austrailian Patent Application No. 2018315192 dated Feb. 8, 2021. 9 pages.
Choudhury, S. Roy, et al., "Supramolecular reactive sulphur nanoparticles: a novel and efficient antimicrobial agent," J. Appli. Microbiol, 2013, vol. 114(1), pp. 1-10. 10 pages.
Turganbay, S., et al., "Nanoparticles of Sulfur as Fungicidal Products for Agriculture," Eurasian Chem Tech Journal, 2012, vol. 14, pp. 313-319. 7 pages.
Turganbay, S., et al., "Surface-modification of sulfur nanoparticles with surfactants and application in agriculture," Adv. Mater. Res. 2013, vols. 785-786, pp. 475-479. 6 pages.
Office Action in related Chinese Patent Application No. 201880042530.9 dated Oct. 29, 2020. 17 pages.
Examination Report in related European Patent Application No. 18845221.3 dated Jun. 24, 2021. 4 pages.

(Continued)

*Primary Examiner* — Sheng H Davis
(74) *Attorney, Agent, or Firm* — Schmeiser, Olsen & Watts, LLP

(57) ABSTRACT

A composition containing nano-sulfur and an application thereof, the composition containing nano-sulfur contains nano-sulfur and further contains an anti-agglomeration agent used for preventing or delaying the agglomeration of the nano-sulfur, is provided. The composition containing nano-sulfur may be widely used for preparing toiletries for use on the surface of the skin on humans or animals, pharmaceutical compositions treating skin disorders, pesticides, preservatives for vegetables and fruits, additives for animal feed, additives for mold prevention in paint, mold prevention agents for textiles or (textile) mite-killing agents. The composition containing nano-sulfur is easy to prepare, and the nano-sulfur may remain in the nano state for a long time, reducing or even eliminating the occurrence of the agglomeration of the nano-sulfur, while achieving the goals of being applied in various products and preventing fungus by simply adding a very small amount.

19 Claims, 1 Drawing Sheet

(56) References Cited

OTHER PUBLICATIONS

Office Action in related Japanese Patent Application No. 2019-572818 dated Mar. 16, 2021. 11 pages.
Deep Pore Cleansing Mineral Scrub; ID10129229; Mintel GNPD [online] Feb. 2003, "https://www.gnpd.com/sinatra/recordpage/10129229/from_search/y4aBta2xll/?page=1" accessed Mar. 16, 2021. 6 pages.
Extended European Search Report in related European Patent Application No. 18845221.3 dated Apr. 21, 2020. 7 pages.
Mask; ID4531967; Mintel GNPD [online] Jan. 2017, "https://www.gnpd.com/sinatra/recordpage/4531967/from_search/Rr6QYRAcd3/?page . . . " accessed Mar. 16, 2021. 6 pages.
Tea Tree Purifying Mask; ID3712683; Mintel GNPD [online] Dec. 2015, "https://www.gnpd.com/sinatra/recordpage/3712683/from_search/aczxemvzMy/?page=7" accessed Mar. 16, 2021. 6 pages.
Chen, Yilei, et al. "Chitosan as a functional additive for high-performance lithium-sulfur batteries". Journal of Materials Chemistry A. 3, 15235 (2015). (Year: 2015).
International Search Report aetd Oct. 23, 2018 for PCT/CN2018/099661.
Bhattacharya—Synthesis of surface modified monoclinic nanosulfur as potent fungicide, 2021 Thomas Reuters Derwent ACC No. 2012-D16109.
Non-Final Office Action dated Apr. 23, 2021 for U.S. Appl. No. 16/627,842.
Final Office Action dated Sep. 3, 2021 for U.S. Appl. No. 16/627,842.

\* cited by examiner

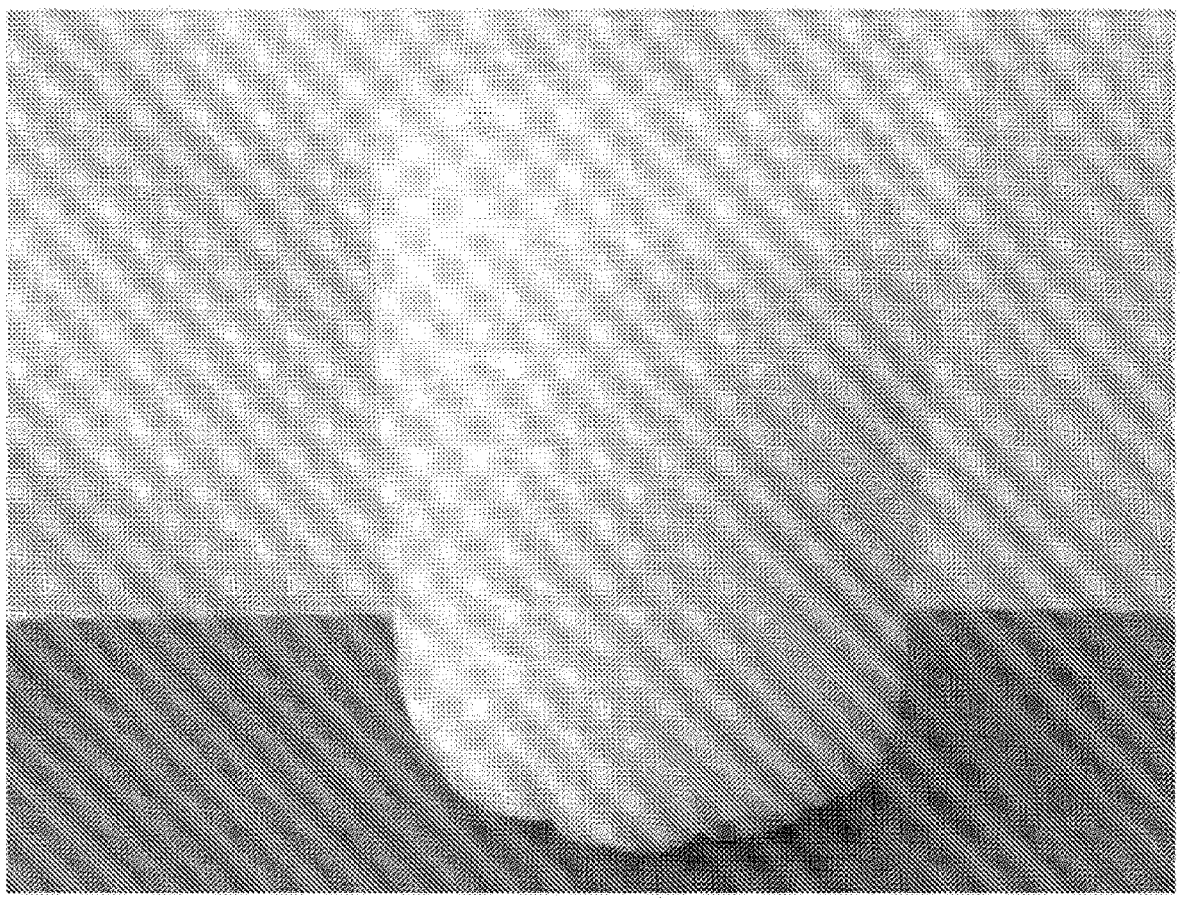

NANO-SULFUR CONTAINING COMPOSITION AND APPLICATION THEREOF

CROSS-REFERENCE TO RELATED APPLICATIONS

This application is a continuation of U.S. application Ser. No. 16/627,842, filed on Dec. 31, 2019, which claims priority to PCT Application No. PCT/CN2018/099661, having a filing date of Aug. 9, 2018, which is based on Chinese Application No. 201710679091.X, having a filing date of Aug. 10, 2017, the entire contents all of which are hereby incorporated by reference.

FIELD OF TECHNOLOGY

The following relates to a nano-sulfur containing composition and application thereof.

BACKGROUND

Sulfur is a very active non-metallic element that is widely used in the manufacture of sulfuric acid, agricultural chemicals, chemical fibers, rubber, dyes, paper-making, pharmaceuticals, explosives, matches, etc. Sulfur plays an important role in our daily lives, such as sulfuric acid for disinfection, sulfur ointment for treating skin diseases, etc. Sulfur in nature is also closely related to our health. For example, sulfur hot spring is called "soup for skin", which has the effect of softening the stratum corneum of skin and efficacy of antipruritic, detoxification and detoxification. Sulfur hot spring is especially useful to improvement of arthritis, dermatitis and neuralgia, mainly due to the disinfection and sterilization effects of sulfur. Supplying polysulfide-rich food such as garlic, onions, leeks, cabbages, broccoli, cauliflower, etc. to human is particularly beneficial to health, mainly because some of sulfur containing compounds work.

Although sulfur is widely used, its specific application is greatly limited. For example, commercially available sulfur preparations such as sulfur ointments or sulfur creams, although indicated in their instructions that it can treat many skin diseases, the effects are not good in practical clinical applications, and are almost obsolete in the market. The main reasons are as follows: 1) Sulfur is insoluble in water, so the sulfur particles in the paste are large (usually several tens of micrometers) and are difficult to be absorbed by the skin, low in antibacterial activity and bioavailability, and not good in medical effect; 2) The sulfur ointment or cream, with more amount of sulfur used, is irritating. After using, many patients suffer allergic, peeling, and dry skin, and possibly dermatitis after long-term application; 3) The proportion of sulfur used is relatively large, generally about 5%, and some reach 10%, which has a strong sulfur odor.

The raw materials used in the preparation of the commercially available sulfur preparations are all micron-sized particles, and it has been proposed to use nano-sulfur instead of micro-sulfur to prepare a sulfur containing preparation. For example, CN105708770A discloses an acne toner comprising a mixture of a carrier and an active ingredient in a percentage by weight, including: carrier: propylene glycol 3-15%, 1,3-butanediol 6-10%, sorbitol 5-8%, deionized water 64.9-85.2%; functional components: nano-sulfur 0.5-1.3%; other functional ingredients 0.3-0.8%. However, the description of the nano-sulfur in this patent is limited to the nanometer sulfur particle size of 50 nm and it can be obtained by processing elemental sulfur using nanotechnology (see paragraphs [0006] and [0031] of the specification), i.e., the patent does not specifically describe how to obtain nano-sulfur powder with a particle size of about 50 nm and the characterization data of the nano-sulfur powder. According to the existing documentary records (for example, CN1453205A and CN104944381), preparation processes of nano-sulfur powder are usually very complicated, resulting in high cost; in addition, although the particle size of the nano-sulfur powder as a raw material is relatively small, once added into the acne toner system or other application system, the nano-sulfur powder will be significantly agglomerated, forming a larger particle size of sulfur particles, so that it is difficult to effectively act on bacterium or germs on the surface of or in the pores of the skin. Similarly, it is difficult to effectively sterilize other substrates with bacteria or bacteria.

Throughout the sulfur containing products in the conventional art, all sulfur containing products are obtained by firstly obtaining solid sulfur powder with high-purity, and then dispersing the sulfur powder into other components of the sulfur containing products, and mixing. The sulfur containing product obtained by such method, its sulfur is easy to agglomerate, and has low activity, poor effect and limited application.

SUMMARY

An aspect relates to a nano-sulfur containing composition which can be used in various sulfur containing products instead of the known nano-sulfur or micro-sulfur, so that the function of the sulfur active component is more fully used of.

Another aspect of the present disclosure is to provide a preparation method of a nano-sulfur containing composition which is simple in process, and in the obtained composition from which, particle size of nano-sulfur keeps relative small for a long time.

Another aspect of the present disclosure is to provide a sulfur containing product in which the function of the sulfur active component can be more fully used of and has a better application effect.

In order to achieve the aspect above or solve the problems above, a technical solution adopted by the present disclosure is as follows: the present disclosure provides a nano-sulfur containing composition comprising nano-sulfur and anti-agglomerating agent(s) used for preventing or retarding agglomeration of the nano-sulfur.

According to some specific aspects of embodiments of the invention, the anti-agglomerating agent is one or a combination of more selected from thickener(s), suspending agent(s), dispersing agent(s), emulsion(s), binder(s), deflocculating agent(s), coupling agent(s), an antistatic agent(s), surfactant(s), and colloid(s).

According to a further aspect of the present disclosure, the thickener is any one selected from natural thickener(s) and chemically synthesized thickener(s), or any combination thereof, wherein natural thickeners comprise starch, dextrin, acacia, carrageenan, pectin, agar, alginic acid and their salts or derivatives, tamarind gum, chitin, ablmoschus *manihot* gum, linseed gum, *Sesbania* gum, guar gum, locust bean gum, xanthan gum; the chemically synthesized thickener(s) comprise sodium carboxymethyl starch, hydroxypropyl starch ether, sodium starch phosphate, acetyl distarch phosphate, phosphorylated distarch phosphate, and hydroxypropyl distarch phosphate.

According to a further aspect of the present disclosure, the suspending agent is one or a combination of more selected from glycerin, syrup, gum suspension, plant polysaccharide suspension, cellulose suspension, carbopol, povidone, glucan, silicon bentonite, and thixotrope.

According to a further aspect of the present disclosure, the dispersing agent is one or a combination of more selected from sodium silicate, sodium tripolyphosphate, sodium hexametaphosphate, sodium pyrophosphate, triethylhexylphosphoric acid, sodium lauryl sulfate, methyl amyl alcohol, cellulose derivative, polyacrylamide, guar gum, polyethylene glycol, and fatty acid polyethylene glycol ester.

According to a further aspect of the present disclosure, the surfactant is one or a combination of more selected from the group consisting of double-chain ionic surfactant, anionic surfactant, cationic surfactant, and nonionic surfactant. Specifically, including but not limited to the following specific aspects, a double-chain ionic surfactant such as sodium dioctyl sulfosuccinate (AOT); anionic surfactants such as sodium dodecyl sulfonate (SDS), sodium dodecyl benzene sulfonate (DBS); cationic surfactants such as cetyltrimethylammonium bromide (CTAB); nonionic surfactants such as TritonX series (polyoxyethylene ethers).

According to a further aspect of the present disclosure, the colloid is one or a combination of more selected from silicic acid colloid, starch colloid, protein colloid, soybean milk, and colloidal silica.

According to some specific aspects of embodiments of the invention, the anti-agglomerating agent is food additive and/or pharmaceutical excipient.

In some embodiments of the present disclosure, the anti-agglomerating agent is one or a combination of more selected from starch, dextrin, gum arabic, carrageenan, pectin, agar, alginic acid, sodium alginate, alginic acid glycol ester, tamarind gum, chitin, ablmoschus *manihot* gum, linseed gum, *Sesbania* gum, guar gum, locust bean gum, xanthan gum, sodium carboxymethyl starch, hydroxypropyl starch ether, starch sodium phosphate ester, acetyl di starch phosphate, phosphorylated distarch phosphate, hydroxypropyl distarch phosphate, glycerin, syrup, carbopol, povidone, glucan, silicon bentonite, thixotrope, sodium silicate, sodium tripolyphosphate, sodium hexametaphosphate, sodium pyrophosphate, triethylhexylphosphoric acid, sodium lauryl sulfate, methyl pentanol, lignin, carboxymethyl cellulose, hydroxyethyl cellulose, hydroxypropyl cellulose, polyacrylamide, polyethylene glycol, fatty acid polyethylene glycol ester, sodium dioctyl sulfosuccinate, sodium dodecyl sulfonate, sodium dodecyl benzene sulfonate, cetyltrimethylammonium bromide, alkylphenol polyoxyethylene ether, Silicic acid colloid, protein colloid, soybean milk, colloid silica, Span 20, Span 60, Span 80, Tween 20, Tween 60 and Tween 80.

According to the present disclosure, although some commonly used or commonly seen anti-agglomerating agents are listed above, the anti-agglomerating agent of the present disclosure may be any substance which can prevent or delay the agglomeration of nano-sulfur, and may be any anti-agglomerating substance or a combination of multiple anti-agglomerates. The combination of the agglomerated substances has no particular limitation.

According to some preferred aspects of the present disclosure, a mass ratio of the nano-sulfur to the anti-agglomerating agent in the nano-sulfur containing composition is 1-10:0.5-20. In some embodiments, a mass ratio of the nano-sulfur to the anti-agglomerating agent in the nano-sulfur containing composition is 1-10:0.5-10. In some embodiments, a mass ratio of the nano-sulfur to the anti-agglomerating agent in the nano-sulfur containing composition is 1-10:0.5-5. According to a specific aspect of embodiments of the invention, a mass ratio of the nano-sulfur to the anti-agglomerating agent in the nano-sulfur containing composition may be 1-5:0.5-5.

In some embodiments of the present disclosure, the particle diameter of nano-sulfur is 10 μm or less, preferably 5 μm or less, more preferably 5 nm-3000 nm, further preferably 10 nm-2000 nm, and the most preferably 20 nm-500 nm. In some examples, the particle diameter of nano-sulfur may be 20-400 nm, 20-300 nm, 20-200 nm, or 20-150 nm. In some examples, the particle diameter of nano-sulfur may be 30-100 nm. In other examples, the nano-sulfur may have a particle size of 30-90 nm. In other examples, the nano-sulfur may have a particle size of 40-100 nm.

According to embodiments of the invention, the size of the nanoparticles is controllable and adjustable. Specifically, size of the nanoparticles can be controlled by adjusting the component of anti-agglomerating agent and its amount.

In the present disclosure, change of the average particle size of the nano-sulfur is generally less than 30%, preferably less than 20%, more preferably less than 10%, when the nano-sulfur containing composition is placed at room temperature for 6 months.

According to some specific and preferred aspects of embodiments of the invention, the nano-sulfur containing composition further comprises a solvent, and the nano-sulfur and anti-agglomerating agent are dispersed in the solvent.

According to some preferred aspects of embodiments of the invention, the solvent is one or a combination of more selected from water, ethanol, glycerol, and polyethylene glycol. According to a particular aspect of the invention, the solvent is water.

According to a specific and preferred aspect of embodiments of the invention, the nano-sulfur containing composition is in a liquid state.

According to some preferred aspects of the present disclosure, in the nano-sulfur containing composition, the nano-sulfur has a mass content of 0.01%-10%. In some embodiments of the present disclosure, the nano-sulfur containing composition may have a mass content of the nano-sulfur from 0.01% to 7%. In some embodiments of the present disclosure, the nano-sulfur containing composition may have a mass content of from 0.1% to 7%.

According to the present disclosure, the more the anti-agglomerating agent is used, the better the anti-agglomeration effect, but if there is too much agent, it will not dissolve, or it is too thick becoming jelly like. According to some preferred aspects of embodiments of the invention, the anti-agglomerating agent has a mass content of 0.01-25%. In certain embodiments of the invention, the anti-agglomerating agent may have a mass content of 0.5-25%. In certain embodiments of the invention, the anti-agglomerating agent may have a mass content of 0.5-15%. In certain embodiments of the invention, the anti-agglomerating agent may have a mass content of 0.5-5%.

According to some aspects of embodiments of the invention, the nano-sulfur containing composition mainly consists of the nano-sulfur, the anti-agglomerating agent.

According to other aspects of the present disclosure, the nano-sulfur containing composition is mainly composed of nano-sulfur, anti-agglomerating agent, and solvent, wherein the solvent is not particularly limited, but is preferably those commonly used in the field, especially water, alcohol solvents. The specific solvents may be, for example, one or a combination of more selected from water, ethanol, propylene glycol, glycerin, polyethylene glycol, etc.

According to some specific and preferred aspects of embodiments of the invention, the nano-sulfur containing composition is prepared by the following method (a) or (b) or (c):
(a) mixing powdered nano-scale sulfur with solvent(s), anti-agglomerating agent(s), and dispersing uniformly to obtain a nano-sulfur containing composition;
(b) reacting thiosulfate(s) or polysulfide(s) with acid(s) in the presence of anti-agglomerating agent(s) in solvent(s) to obtain a nano-sulfur containing composition;
(c) preparing a nano-sulfur containing composition by micro-emulsion method using thiosulfate(s) or a polysulfide(s), and acid(s) as reaction raw material.

From the above methods (a), (b) and (c), the methods (b) and (c) are more preferred. For the nano-sulfur containing composition prepared by the method (b) or (c), the particle size of nano-sulfur is smaller, more uniform, more stable, and the use effect is significantly better.

According to some specific and preferred aspects of embodiments of the invention, the thiosulfate salt may be one or a combination of more selected from thiosulfate, ammonium thiosulfate, and potassium thiosulfate.

According to embodiments of the invention, the polysulfide is a compound containing polysulfide ion $S_x$, $x=2, 3, 4, 5, 6, \ldots, 9$. When polysulfide is acidified, hydrogen sulfide and sulfur are released: $S_x+2H \rightarrow H_2S+(x-1)S$. According to some specific and preferred aspects of embodiments of the invention, the polysulfide may be one or a combination of more selected from sodium polysulfide, potassium polysulfide, and ammonium polysulfide.

According to embodiments of the present disclosure, the acid may be selected from any inorganic acid, organic acid or a combination of the two, wherein the organic acid includes, but is not limited to, citric acid, tartaric acid, salicylic acid, benzoic acid, carboxylic acid, lactic acid, etc. The inorganic acids include, but are not limited to, hydrochloric acid, sulfuric acid, boric acid, nitric acid, etc. According to some specific and preferred aspects of embodiments of the invention, the acid may be one or a combination of more selected from hydrochloric acid, benzoic acid, acetic acid, citric acid, tartaric acid, boric acid, salicylic acid, lactic acid, sulfuric acid, and nitric acid.

In order to achieve the above object or solve the above problems, another technical solution adopted by the present disclosure is as follows: a preparation method of a nano-sulfur containing composition as described above, the preparation method comprising: making thiosulfate or polysulfide react with an acid in the presence of an anti-agglomerating agent and in a solvent to obtain a nano-sulfur containing composition.

According to some specific and preferred aspects of embodiments of the invention, the thiosulfate is one or a combination of more selected from sodium thiosulfate, ammonium thiosulfate, and potassium thiosulfate.

According to some specific and preferred aspects of embodiments of the invention, the polysulfide is one or a combination of more selected from sodium polysulfide, potassium polysulfide, ammonium polysulfide.

According to some specific and preferred aspects of embodiments of the invention, the acid is one or a combination of more selected from hydrochloric acid, benzoic acid, acetic acid, citric acid, tartaric acid, boric acid, salicylic acid, lactic acid, sulfuric acid, nitric acid.

In order to achieve the object above or solve the problems above, yet another technical solution adopted by the present disclosure is as follows: Use of the nano-sulfur containing composition as described above for the preparation of a sulfur containing product.

In some embodiments of the present disclosure, the sulfur containing product are toiletries for use on the surface of the skin on humans or animals, drugs for treating skin disorders, drugs for treating tumors, drugs for treating hair disorders, agricultural chemicals, plant preservatives for vegetable and fruits, additives for animal feed, additives for mold-prevention in paint, mold prevention agents for textiles or textile mite-killing agents.

In order to achieve the object above or solve the problems above, another technical solution adopted by the present disclosure is as follows: a sulfur containing product, which is prepared by the following steps:
(1) providing a nano-sulfur containing composition as described above;
(2) mixing the nano-sulfur containing composition as described above with other components of the sulfur containing product.

In some embodiments of the present disclosure, the sulfur containing product are toiletries for use on the surface of the skin on humans or animals, drugs for treating skin disorders, drugs for treating tumors, drugs for treating hair disorders, agricultural chemicals, plant preservatives for vegetable and fruits, additives for animal feed, additives for mold-prevention in paint, mold prevention agents for textiles or textile mite-killing agents.

Specifically, the nano-sulfur containing composition improved according to the present disclosure can maintain the nano-sulfur in a nano-dispersed state for a long period, thereby effectively improving the activity and efficacy of sulfur, and helping to reduce the amount of sulfur used, and are particularly suitable for preparation of toiletries and drugs directed for the surface of the skin of humans or animals, and also suitable for adding to drugs for treating tumor, drugs for treating hair disorders, agricultural chemicals, preservatives for vegetables, fruits plant, etc., additives for animal feed, additives for mold-prevention in paint, mold prevention agents for textiles or (textile) mite-killing agents.

For example, toiletries prepared in accordance with the conception of the present disclosure are effective in preventing, ameliorating, alleviating or eliminating fungal infections of the skin. In some embodiments of the present disclosure, the toiletries are face cream, emulsifiable paste, body wash, hair shampoo, body lotion, moisturizer, facial cleanser, hand sanitizer, Florida water, soap, cleansing foam, facial mask, shampoo, vanishing cream, anti-cracking oil, essence, whitening cream, sunscreen lotion, freckle cream, hand cream, moisturizing balance liquid, moisturizing cream, toner, firming lotion or astringent water. Although specific names of some of the above-described toiletries have been disclosed, the present disclosure is not limited to these specific toiletries, but may be other similar daily use products. The toiletries, with addition of the nano-sulfur containing composition, when used on any skin surface of the whole body, has anti-fungal function, treating, alleviating, and preventing various skin disorders such as phlegm, dermatitis, pityriasis, eczema, etc.; when used for hair washing, hair care, can treat fungal dandruff; when used on foot, can treat and prevent fungal diseases of the foot such as tinea pedis.

In some embodiments of the present disclosure, the nano-sulfur containing composition may be added in a very small amount in the toiletries, and usually is added with the amount that the content of the nano-sulfur in the toiletries is about 0.005-0.25%.

Further, as the pharmaceutical composition prepared according to the conception of the present disclosure, it is effective for treating skin fungal infections and treating various skin diseases such as skin dermatitis, dermatitis, pityriasis, eczema, etc. In the pharmaceutical composition, the nano-sulfur containing composition is added in an effective amount. In general, in some embodiments of the present disclosure, the nano-sulfur containing composition may be added to the pharmaceutical composition in an amount less than the amount of nano-sulfur added in the conventional art, and usually is added with the amount that the content of the nano-sulfur in the pharmaceutical composition is about 0.01%-0.5%.

In some embodiments of the invention, the pharmaceutical composition further comprises a synergist. The synergist may, for example, be one or a combination of more selected from alum, zinc oxide or borax. Generally, in the pharmaceutical composition, the synergist may have a mass content of 1-5%.

In some embodiments of the invention, the pharmaceutical composition may further comprise a humectant. The humectant may be, for example, one or a combination of more selected from polyhydric alcohols, hyaluronic acid, ceramides, collagen, urea, chitin derivatives, aloe vera or seaweed extracts. Generally, the humectant may have a mass content of 2-10% in the pharmaceutical composition.

In some embodiments of the invention, the pharmaceutical composition may be in the form of ointment, gel, emulsifiable paste or liquid.

In some embodiments of the invention, the pharmaceutical composition may further comprise an active substance that can treat a skin disorder other than the nano-sulfur containing composition.

In the practical application of the nano-sulfur containing composition of the present disclosure, since the amount of nano-sulfur added is small, the sulfur in the whole product has a content of only a few thousandths, thereby the drying and peeling of the skin is weakened or even avoided.

Meanwhile, in the present disclosure, the prepared nano-sulfur containing composition may be directly added to other substrates, and although it contains a small amount of sodium salt, potassium salt or ammonium salt, etc., there is no need to remove, such as sodium chloride, which is harmless when used in a very small amount, and such as sodium acetate, which has antiseptic effect, so the prepared nano-sulfur containing composition can be directly applied to the product without additional operations to remove other substances. The effect of additional factors on the maintenance of the nanostate of nano-sulfur is reduced or even avoided.

Due to the adoption of the technical solutions above, the present disclosure has following advantages compared with the conventional art:

Embodiments of the invention overcome the defects that the nano-sulfur is easy to agglomerate during the preparation or use of the traditional nano-sulfur, and realizes that the nano-sulfur can keep nano-state for a long time. After the nano-sulfur containing composition has been kept for a long time by the inventor (more than half a year at present), the nano-sulfur in the prepared composition was still maintained in the nano-state and uniformly dispersed in the dispersion medium, which basically eliminated agglomeration. The nano-sulfur containing composition of the present disclosure can be added to any product requiring sulfur, and can obtain a better effect with a lower addition amount.

The sulfur containing product of embodiments of the invention, wherein the nano-sulfur keeps a very good dispersion and a small particle size, the sulfur activity can be fully exerted, and the application effect is significantly better. At the same time, due to that the activity of sulfur can be fully developed, the amount of sulfur can be greatly reduced, which can reduce or avoid the negative problems caused by the big amount of sulfur. In addition, the sulfur containing product of embodiments of the invention has low cost. Therefore, the sulfur containing product of embodiments of the invention is easy to be popularized.

BRIEF DESCRIPTION

Some of the embodiments will be described in detail, with references to the following FIGURES, wherein like designations denote like members, wherein:

FIG. 1 is a photograph of a nano-sulfur containing composition, which was prepared in Example 1 of the present disclosure and placed in static station for half a year;

wherein, the nano-sulfur still maintains the initial state and is still uniformly dispersed in the dispersion medium.

DETAILED DESCRIPTION

The conventional preparation method of the sulfur containing product is to obtain a high-purity solid sulfur powder firstly, and then disperse the sulfur powder into other components of the sulfur containing product, and mix them to obtain a sulfur containing product. The sulfur products obtained by the traditional method are easy to agglomerate even if the particle size of the raw material sulfur powder is very small and various auxiliary dispersion means are used, which will affect the use effect.

Through research, the inventor accidentally found that the nano-sulfur formed is not easy to agglomerate when an assistant (or anti agglomerate) which can prevent or delay agglomeration is added before the formation of nano-sulfur and the assistant is still retained after the formation of nano-sulfur. Furthermore, when the composition of the nano-sulfur and the auxiliary agent is used to prepare sulfur containing products, the nano-sulfur keeps a very good dispersion performance and a small particle size, so the activity of sulfur in the prepared sulfur containing products can be brought into full play, and the application effect is significantly better. Furthermore, as the activity of sulfur can be brought into full play, the amount of sulfur can be greatly reduced, which can reduce or avoid the negative problems caused by the big amount of sulfur Embodiments of the invention overcome the traditional prejudice that the high-purity sulfur powder should be prepared first and then used (it is generally believed that there may be a small amount of impurities in the raw material, but the by-products are not allowed, otherwise the quality is not good, for example, the purity is emphasized in many literatures on nano-sulfur). In addition to nano-sulfur, the nano-sulfur containing composition of some embodiments of the present disclosure contains auxiliary agent (anti-agglomerating agent) and residual thiosulfate, polysulfide and acid, etc. These components are not only harmless, but also beneficial in most cases. The following are illustrating examples:

A. Sodium chloride (edible salt): a by-product produced by the reaction of sodium thiosulfate with hydrochloric acid to prepare sulfur, which is beneficial in toiletries for skin and hair such as shampoos and soaps, and is also beneficial in animal feed.

B. Sodium lactate: a by-product produced by the reaction of sodium thiosulfate with lactic acid to produce sulfur, which can be used as a humectant and is beneficial in toiletries for skin and hair and medicines. Sulfur makes skin dry and even leads to peeling, and has adverse side effects. Sodium lactate has moisturizing effect, which just solves the problem of dry skin. To make nano-sulfur drugs and skin care products, it is just necessary to add moisturizers, and even moisturizers must be used to eliminate the adverse side effects of nano-sulfur.

C. Ammonium lactate: a by-product produced by the reaction of ammonium thiosulfate with lactic acid to produce sulfur, which is widely used in foods, beverages, dairy products, nutrient solutions, medicines, etc., and also can be used as feed additives.

D. Sodium citrate: a by-product produced by the reaction of sodium thiosulfate with citric acid to prepare sulfur, which is often used as additives and preservatives for food, etc., and also can be added to toiletries for skin and hair.

E. Ammonium chloride: a by-product produced by the reaction of ammonium thiosulfate with hydrochloric acid to produce sulfur, which can be used as fertilizer. When a nano-sulfur mixture is used as an agricultural chemical, a small amount of ammonium chloride is not only harmless but also can serve as a fertilizer.

F. Sodium tartrate: a by-product produced by the reaction of sodium thiosulfate with tartaric acid to prepare sulfur, which is often used in additives for foods and beverages, antioxidants, and is applied to the pharmaceutical and food industries.

G. Sodium benzoate: a by-product produced by the reaction of sodium thiosulfate with benzoic acid, which is often used as bactericides, preservatives, antimicrobial agents, etc., and can be used in toiletries for skin and hair.

H. Sodium borate: a by-product produced by the reaction of sodium thiosulfate with boric acid to prepare sulfur, which can be used for disinfection and antisepsis of skin mucosa, tinea pedis, colpitis mycotica, cervical erosion, bedsore, acne, external ear canal eczema, herpes virus skin. It can be used for the treatment of tumors and also as a feed additive. Boron-containing trace element fertilizers in agriculture have fertilizer effects on many crop and can improve quality of crops and increase yield.

I. Sodium acetate: a by-product of sodium thiosulfate and acetic acid, which can be used as a buffering agent, a flavoring agent, a flavor intensifier and a pH adjusting agent, and has certain antiseptic and antifungal effects, and can be used for toiletries for skin and hair.

Other by-products and the like are not illustrated one by one, but they are all beneficial, at least harmless.

Specifically, according to different applications of sulfur containing products, appropriate anti-agglomerating agent, thiosulfate or polysulfide and acid for preparation can be selected to obtain nano-sulfur and beneficial additives at the same time, which can be described as killing two birds with one stone. More importantly, the complex and high-cost purification process is avoided, greatly reduce the cost of nano-sulfur production.

Anti-Agglomerating Agent

The anti-agglomerating agent of the present disclosure may be any substance which can prevent or delay the agglomeration of nano-sulfur, and may be any anti-agglomerating substance or a combination of a plurality of anti-agglomerating substances, and is not particularly limited.

Specifically, the types of substances that can prevent or delay nano-sulfur agglomeration are very broad, including but not limited to various thickeners, suspending agents, dispersing agents, emulsions, coupling agents, antistatic agents, surfactants, and sols, gel, etc. These specific anti-agglomerating agents all have anti-agglomeration effects, just that the degree of effect is different.

(1) Thickener

The thickener of the present disclosure is not particularly limited and may be selected from any one or a combination of more selected from natural thickener and chemically synthesized thickener. Natural thickeners include, but are not limited to, various starches (wheat flour, rice flour, potato flour, pueraria powder, etc.), dextrin, gelatin, gum arabic, carrageenan, pectin, agar, alginic acid thickener, tamarind gum, chitin, ablmoschus *manihot* gum, linseed gum, *Sesbania* gum, guar gum, locust bean gum, xanthan gum. Chemically synthesized thickeners include, but are not limited to, sodium carboxymethyl starch, hydroxypropyl starch ether, sodium starch phosphate, acetyl distarch phosphate, phosphorylated distarch phosphate, hydroxypropyl distarch phosphate, etc.

(2) Suspending Agent

Suspending agents are additives that can increase the viscosity of the dispersion medium to reduce the sedimentation speed of the particles or increase the hydrophilicity of the particles. The suspending agent of the present disclosure may be various suspending agents, and is not particularly limited. For example, it may be a low molecular suspending agent such as glycerin, syrup, etc., and glycerin is often added to the suspension for external use; it may be a polymeric suspending agent. Polymeric suspending agents include:

A. Natural polymeric suspending agent: mainly gum trees, such as gum arabic, gummi tragacanthae, peach gum and so on. Gum arabic and gummi tragacanthe can be used in its powder or mucilage. There are also plant polysaccharides such as sodium alginate, agar, starch slurry, etc.

B. Synthetic or semi-synthetic polymeric suspending agents: celluloses such as methyl cellulose, sodium carboxymethyl cellulose, hydroxypropyl cellulose. Others such as carbopol, povidone, glucan, etc. Most of these suspending agents are stable in nature and are less affected by pH, but it should be taken into consideration that certain suspending agents change compatibly with drugs or other additives.

C. Silicon bentonite: It is a natural hydrous aluminum silicate, which is a grayish yellow or milky white very fine powder with a diameter of 1 to 150 μm. It is insoluble in water or acid, but swells in water and increases its volume by about 10 times to form a high viscous gel which is thixotropy and pseudoplastic gels, and they have greater swellability, higher viscosity and better suspending effect at pH>7.

D. Thixotropic gel: The thixotropic property of the thixotropy gel, that is, the property of constant temperature transformation between gel and sol, is used to form gel to prevent the particles from sedimenting when it is standing, and to change into sol when it is shaking so it becomes easier to pour out. The use of thixotropic suspending agents facilitates the stability of the suspension. Dissolving aluminum monostearate in plant oil forms a typical thixotropic gel. Some aqueous solutions of polymer compounds with plastic flow and pseudoplastic flow are often thixotropic and can be used selectively.

According to some embodiments of the invention, suspending agents specifically employed are, for example, colloidal silica, carboxymethylcellulose (CMC), sodium alginate, sodium carboxymethylcellulose (CMC-Na), and etc.

(3) Dispersing Agent

Dispersing agent are agents that promote the uniform dispersion of material particles in a medium to form a stable suspension. Dispersing agents are generally classified into two types: inorganic dispersing agents and organic dispersing agents. Common inorganic dispersing agents are silicates (such as sodium silicate) and alkali metal phosphates (such as sodium tripolyphosphate, sodium hexametaphosphate, sodium pyrophosphate, etc.). Organic dispersing agents include triethylhexylphosphoric acid, sodium lauryl sulfate, methylpentanol, cellulose derivatives, polyacrylamide, guar gum, fatty acid polyethylene glycol esters, etc.

(4) Emulsion

The oil, surfactant, water (electrolyte aqueous solution) or co-surfactant are mixed evenly, then a co-surfactant or water (electrolyte aqueous solution) is added into the system, and a microemulsion can be formed within a certain range of proportions.

Commonly used surfactants are: double-chain ionic surfactants, such as sodium dioctyl sulfosuccinate (AOT); anionic surfactants such as sodium dodecyl sulfonate (SDS), dodecyl benzene Sodium sulfonate (DBS); cationic surfactants such as cetyltrimethylammonium bromide (CTAB); nonionic surfactants such as TritonX series (polyoxyethylene ethers). By using the dispersion of the microemulsion, the nano-sulfur particles can be dispersed and the nano-sulfur agglomeration can be prevented.

(5) Colloid

The colloid includes various sols, gels, etc., and specific examples are sillic acid colloid, starch colloid, protein colloid, soybean milk, etc. Various colloidal substances are beneficial to the dispersion of nano-sulfur and prevent the aggregation of nano-sulfur.

(6) Other Anti-Agglomerating Agents

Other anti-agglomerating agents such as coupling agents, antistatic agents, surfactants, emulsions, etc., can exert an anti-agglomeration effect by improving the surface characteristics of the particles or the interaction between the particles.

The type of the surfactant is not limited, and may be one or a combination of more from double-chain ionic surfactant, anionic surfactant, cationic surfactant, and nonionic surfactant, wherein the double-stranded ion surfactant may be, for example, sodium dioctyl sulfosuccinate, the anionic surfactant may be, for example, sodium dodecyl sulfonate or sodium dodecylbenzene sulfonate, and the cationic surfactant may be, for example, the cetyltrimethylammonium bromide, nonionic surfactant may be, for example, a polyoxyethylene ether surfactant.

The emulsion is, for example, Tween 60 and Span 20.

According to some preferred aspects of embodiments of the invention, the anti-agglomerating agent is a food additive or a pharmaceutical adjuvant.

Test Method for Nano-Sulfur Particle Size

The particle size of the nano-sulfur containing composition was tested by GBT 19627-2005 particle size analysis photon correlation spectroscopy and GB/T 29022-2012 particle size analysis dynamic light scattering (DLS). The test temperature was room temperature 25° C.

Application of Nano-Sulfur Containing Composition for Preparing Antifungal Drugs or Toiletries The nano-sulfur containing composition of embodiments of the invention can make the nano-sulfur maintain the nano-state for a long period without agglomeration, avoid agglomerating into a large particle state, which is difficult to be absorbed by the skin, thus showing poor effect of anti-fungus and skin disease treatment, and at the same time, it can be used as an active ingredient in toiletries and pharmaceutical compositions. In toiletries and pharmaceutical compositions, active ingredient are not limited to the nano-sulfur containing composition of the present disclosure, other ingredients may also be present, which depends on needs of consumers; and appropriate forms of toiletries and pharmaceutical compositions such as paste, liquid, etc., may be selected according to the practical situation.

Embodiments of the invention are applied to an antifungal drug or toiletries, and solves the problem that the nano-sulfur in the traditional nano-sulfur containing product is not a true nanostate (the large particle sulfur is hard to be absorbed by the skin playing a bactericidal effect), on the one hand, the nano-sulfur is easily absorbed by the skin, which can greatly reduce the amount of sulfur used, reduce or even eliminate the side effects of dry skin caused by traditional sulfur containing products, and, on the other hand, due to great reduction of the amount of sulfur used, there is almost no smell odor of sulfur, and its appearance and fragrance (can be added additionally) are the same as ordinary skin care products. What's more, the products containing nano-sulfur of embodiments of the invention do not contain hormones (the purpose of adding hormones in traditional anti bacteria drugs is to use its anti-allergic, anti-inflammatory, antipruritic and other effects, while the use of hormones has obvious side effects, long-term use will cause their own physiological function disorder), can replace the traditional antifungal drugs, to treat various dermatitis, stubborn tinea, eczema, etc.

The toiletries according to the present disclosure especially refer to toiletries for using on the skin surface of humans or animals.

In some embodiments of the present disclosure, the toiletries are face cream, emulsifiable paste, body wash, hair shampoo, body lotion, moisturizer, facial cleanser, hand sanitizer, Florida water, soap, cleansing foam, facial mask, shampoo, vanishing cream, anti-cracking oil, essence, whitening cream, sunscreen lotion, freckle cream, hand cream, moisturizing balance liquid, moisturizing cream, toner, firming lotion or astringent water. Although specific names of some of the above-described toiletries have been disclosed, the present disclosure is not limited to these specific toiletries, but may be other similar daily use products. (the toiletries, with addition of the nano-sulfur, when used on any skin surface of the whole body, has anti-fungal function, treating, alleviating, and preventing many skin disorders such as tinea, dermatitis, pityriasis, eczema, etc.; When used for hair washing and hair care, can treat fungal dandruff; when used on foot, can treat and prevent fungal diseases of the foot such as tinea pedis).

In some embodiments of the present disclosure, the nano-sulfur containing composition may be added in a very small amount in the toiletries, and usually is added with the amount that the content of the nano-sulfur in the toiletries is about 0.005-0.25%.

In the antifungal drugs for external use of the present disclosure, the nano-sulfur containing composition is added in an effective amount. In general, in some embodiments of the present disclosure, the nano-sulfur containing composition may be added to the pharmaceutical composition in an amount less than the amount of nano-sulfur added in the conventional art, and usually is added with the amount that the content of the nano-sulfur in the antifungal drugs for external use is about 0.01%-0.5%.

In some embodiments of the invention, the antifungal drugs for external use further comprises a synergist. The synergist may, for example, be one or a combination of more selected from alum, zinc oxide or borax. Generally, in the antifungal drugs for external use, the synergist may have a mass content of 1-5%.

In some embodiments of the invention, the antifungal drugs for external use may comprise a humectant. The humectant may be, for example, one or a combination of more selected from polyhydric alcohols, hyaluronic acid, ceramides, collagen, urea, chitin derivatives, aloe vera or seaweed extracts. Generally, in the antifungal drugs for external use, the humectant may have a mass content of 2-10%.

In some embodiments of the invention, the antifungal drugs for external use is in the form of an ointment, a gel, an emulsifiable paste or a liquid.

In some embodiments of the present disclosure, the antifungal drugs for external use may include an active substance other than the nano-sulfur containing composition that can treat a skin disease.

In the practical application of the nano-sulfur containing composition of the present disclosure, since the added amount of nano-sulfur is small, the sulfur content in the whole product is only a few thousandths, thereby weakening or even avoiding the drying and peeling of the skin.

Meanwhile, in the present disclosure, the prepared nano-sulfur containing composition may be directly added to other substrates, and although it contains a small amount of sodium salt, potassium salt or ammonium salt, etc., there is no need to remove, such as sodium chloride. very small amount of which is harmless, and such as sodium acetate, which itself has antiseptic effect, so the nano-sulfur containing composition prepared can be directly applied to the product without additional operations to remove other substances. Also, the effect of additional factors on the maintenance of the nanostate of nanosulfur is reduced or even avoided.

According to some embodiments of the present disclosure, the sulfur containing product comprises not only (i) elemental sulfur, (ii) anti-agglomerating agent, but also (iii) thiosulfate or sulfide and/or (iv) acid ion. Where there's no evidence to the contrary, a sulfur containing product having all of (i), (ii) and (iii) or a sulfur containing product having all of (i), (ii) and (iv) or a sulfur containing products having all of (i), (ii), (iii) and (iv) shall be considered to be within the protection scope of this patent.

The above embodiments are further described in conjunction with the specific embodiments; the embodiments are intended to illustrate the basic principles, main features and advantages of the present disclosure, and the present disclosure is not limited by the scope of the following embodiments; The implementation conditions can be further adjusted according to specific requirements, and the unspecified implementation conditions are usually the conditions in the routine experiment. In the following, all the raw materials are commercially available or prepared by a conventional method in the art, and the particle diameter of the sulfur particles is measured by GB/T 29022-2012/particle size analysis or dynamic light scattering method (DLS).

Example 1

This example provides a nano-sulfur containing composition, the raw materials of which comprise sodium thiosulfate pentahydrate, hydroxypropyl starch ether, hydrochloric acid and water. The preparation method was as follows:

50 g of sodium thiosulfate pentahydrate and 1 g of hydroxypropyl starch ether were weighted, and sodium thiosulfate pentahydrate was dissolved in water to prepare an aqueous sodium thiosulfate solution containing 50% by mass of sodium thiosulfate. Hydroxypropyl starch ether was then added to the aqueous sodium thiosulfate solution, and finally a 10% by mass hydrochloric acid solution was added to the aqueous sodium thiosulfate solution (wherein the molar ratio of the added thiosulfate to the hydrogen ion was 1:2), and the system was ultrasonically stirred until the reaction was completed, to give a nano-sulfur containing composition. The mass content of nano-sulfur in the obtained nano-sulfur containing composition was about 3.06%. The nano-sulfur containing composition prepared in this example contained sodium chloride as a by-product, which is beneficial in skin and hair care products such as shampoo and soap and is also beneficial in animal feed, so there is no need to remove them as taught by traditional prejudices, while the measured average particle size of sulfur therein was about 132 nanometer. After being placed at room temperature for 6 months post the preparation, a photograph taken is shown in FIG. 1.

Example 2

This example provides a nano-sulfur containing composition, the raw materials of which comprise sodium thiosulfate, guar gum, acetic acid, and water. The preparation method was as follows:

50 g of sodium thiosulfate and 1.5 g of guar gum were weighed, and sodium thiosulfate was dissolved in water to prepare an aqueous sodium thiosulfate solution containing 60% by mass of sodium thiosulfate, and then guar gum was added to the aqueous sodium thiosulfate solution, and finally a 10% by mass acetic acid solution was added to the sodium thiosulfate solution (wherein, the molar ratio of added thiosulfate to hydrogen ion was 1.05:2), and the system was ultrasonically stirred until the reaction was completed, to give a nano-sulfur containing composition. The mass content of nano-sulfur in the obtained nano-sulfur containing composition was about 2.17%. The nano-sulfur containing composition prepared in this example further contained sodium acetate as a by-product, which can be used as a buffering agent, a flavoring agent, a fumet agent and a pH adjusting agent, and has certain anti-mold and anti-fungal effects, and can be used in skin and hair care products, so there is no need to remove it as taught by traditional prejudices, and the measured average particle size of sulfur therein was about 173 nm.

Example 3

This example provides a nano-containing sulfur composition, the raw materials of which comprise sodium thiosulfate, phosphorylated distarch phosphate, acetic acid and water. The preparation method was as follows:

50 g of sodium thiosulfate and 2 g of phosphorylated distarch phosphate were weighted, and sodium thiosulfate was dissolved in water to prepare an aqueous sodium thiosulfate solution containing 65% by mass of sodium thiosulfate; the phosphorylated distarch phosphate was added to a 40% by mass acetic acid solution to form a mixed solution, and then the mixed solution was added to the aqueous sodium thiosulfate solution (wherein the molar ratio of the added thiosulfate to the hydrogen ion was 1:2), and the system was ultrasonically stirred until the reaction was completed, to give a nano-sulfur containing composition. The mass content of nano-sulfur in the obtained nano-sulfur containing composition was about 5.9%. The nano-sulfur containing composition prepared in this example contained sodium acetate as a by-product, which can be used as a buffering agent, a flavoring agent and a fumet agent and pH adjuster, and has certain anti-mold and anti-fungal effects, and can be used in skin and hair care products, so there is no need to remove it as taught by traditional prejudices.

Example 4

This example provides a nano-sulfur containing composition, the raw materials of which comprise sodium thiosulfate, xanthan gum, acetic acid and water. The preparation method was as follows:

50 g of sodium thiosulfate and 2 g of xanthan gum were weighted, sodium thiosulfate was dissolved in water to prepare an aqueous sodium thiosulfate solution containing 60% by mass of sodium thiosulfate; the xanthan gum was added to a 10% by mass acetic acid solution to form a mixed solution, and the mixed solution was added to the aqueous sodium thiosulfate solution (wherein the molar ratio of the added thiosulfate to hydrogen ion was 1:2), and the system was ultrasonically stirred until the reaction was completed, to give a nano-sulfur containing composition. The mass content of nano-sulfur in the obtained nano-sulfur containing composition was about 2.19%. The nano-sulfur containing composition prepared in this example contained sodium acetate as a by-product, which can be used as a buffering agent, a flavoring agent, a fumet agent and a pH adjusting agent, and has certain anti-mold and anti-fungal effects, and can be used in skin and hair care products, so there is no need to remove it as taught by traditional prejudices, and the measured average particle size of sulfur therein was about 285 nm.

Example 5

This example provides a nano-sulfur containing composition, the raw materials of which comprise sodium thiosulfate, carboxymethyl cellulose, hydrochloric acid, benzoic acid, and water. The preparation method was as follows:

50 g of sodium thiosulfate and 2 g of carboxymethyl cellulose were weighed, sodium thiosulfate was dissolved in water to prepare an aqueous sodium thiosulfate solution containing 65% by mass of sodium thiosulfate; carboxymethyl cellulose was added to a complex acid solution of 10% by mass of hydrochloric acid and benzoic acid (the molar ratio of the added hydrogen chloride to benzoic acid was 1:1) to form a mixed solution, and then the mixed solution was added to the aqueous sodium thiosulfate solution (wherein the molar ratio of the added thiosulfate to hydrogen ion was 1:2), and the system was ultrasonically stirred until the reaction was completed, to give a nano-sulfur containing composition. The mass content of the nano-sulfur in the obtained nano-sulfur containing composition was about 1.75%. The nano-sulfur containing composition prepared in this example contained sodium chloride and sodium benzoate as by-products, while sodium chloride is beneficial in skin and hair care products such as shampoo and soap, and is also beneficial in animal feed, and sodium benzoate is often used as a bactericide, preservative, antimicrobial agent, etc., and can also be used in skin and hair care products, so it is unnecessary to remove these two materials as taught by traditional prejudices, and the measured average particle size of sulfur was about 46 nm.

Example 6

This example provides a nano-sulfur containing composition, the raw materials of which comprise sodium thiosulfate, hydroxyethyl cellulose, acetic acid, and water. The preparation method was as follows:

50 g of sodium thiosulfate and 2 g of hydroxyethyl cellulose were weighed, and sodium thiosulfate was dissolved in water to prepare an aqueous sodium thiosulfate solution containing 65% by mass of sodium thiosulfate; hydroxyethyl cellulose was added to a 10% by mass acetic acid solution to form a mixed solution, and the mixed solution was added to the aqueous sodium thiosulfate solution (wherein the molar ratio of the added thiosulfate to the hydrogen ion was 1:2), and the system was ultrasonically stirred until the reaction was completed, to give a nano-sulfur containing composition.

The mass content of the nano-sulfur in the nano-sulfur containing composition obtained was about 2.22%. The nano-sulfur containing composition prepared in this example contained sodium acetate as a by-product, which can be used as a buffering agent, a flavoring agent, a fumet agent and a pH adjusting agent, and has certain anti-mold and anti-fungal effects, and can be used in skin and hair care products, so there is no need to remove it as taught by traditional prejudices, and the measured average particle size of sulfur therein was about 43 nm.

Example 7

This example provides a nano-sulfur containing composition, the raw materials of which comprise sodium thiosulfate, polyethylene glycol, citric acid, and water. The preparation method was as follows:

50 g of sodium thiosulfate and 20 g of polyethylene glycol were weighted, and sodium thiosulfate was dissolved in water to prepare an aqueous sodium thiosulfate solution containing 60% by mass of sodium thiosulfate; polyethylene glycol was added to a 10% by mass citric acid solution to form a mixed solution, and then the mixed solution was added to the aqueous sodium thiosulfate solution (wherein the molar ratio of the added thiosulfate to hydrogen ion was 1:2), and the mixture was ultrasonically stirred until the reaction was completed, to give a nano-sulfur containing composition. The mass content of nano-sulfur in the obtained nano-sulfur containing composition was about 2.07%. The nano-sulfur containing composition prepared in this example also contained sodium citrate as a by-product, which is often used as a food additive and a preservative and the like, and can also be added to skin and hair care products, so there is no need to remove it as taught by traditional prejudices, and the measured average particle size of sulfur therein was about 180 nm.

Example 8

This example provides a nano-sulfur containing composition, the raw materials of which comprise sodium thiosulfate, povidone, tartaric acid and water. The preparation method was as follows:

50 g of sodium thiosulfate and 2 g of povidone were weighed, and sodium thiosulfate was dissolved in water to prepare a sodium thiosulfate aqueous solution containing 60% by mass of sodium thiosulfate; povidone was added to a 10% by mass tartaric acid solution to form a mixed solution, and the mixed solution was added to the aqueous sodium thiosulfate solution (wherein the molar ratio of the added thiosulfate to hydrogen ion was 1:2) and the mixture was ultrasonically stirred until the reaction was completed, to give a nano-sulfur containing composition. The mass content of the nano-sulfur in the nano-sulfur containing composition obtained was about 1.81%. The nano-sulfur containing composition prepared in this example contained sodium tartrate as a by-product, which is often used as food and beverage additives and antioxidants, and is also used in the pharmaceutical and food industries, so there is no need to be removed as taught by traditional prejudices. The measured average particle size of sulfur therein was about 132 nm.

Example 9

This example provides a nano-sulfur containing composition, the raw materials of which comprise sodium thiosulfate, sodium alginate, benzoic acid and water. The preparation method was as follows 50 g of sodium thiosulfate and 2 g of sodium alginate were weighed, sodium thiosulfate was dissolved in water to prepare an aqueous sodium thiosulfate solution containing 50% by mass of sodium thiosulfate; sodium alginate was added to a 10% by mass benzoic acid solution to form a mixed solution, and then the mixed solution was added to the aqueous sodium thiosulfate solution (wherein the molar ratio of the added thiosulfate to the hydrogen ion was 1:2), and the system was ultrasonically stirred until the reaction was completed, to give a nano-sulfur containing composition. The mass content of nano-sulfur in the obtained nano-sulfur containing composition was about 1.16%. The nano-sulfur containing composition prepared in this example contained sodium benzoate as a by-product, which is often used as a bactericide, a preservative, an antimicrobial agent, etc., and can be used in skin and hair care products, so there is no need to remove it as taught by traditional prejudices. The measured average particle size of sulfur therein was about 30 nm.

Example 10

This example provides a nano-sulfur containing composition, the raw materials of which comprise sodium thiosulfate, starch, boric acid, and water. The preparation method was as follows:

50 g of sodium thiosulfate and 8 g of starch were weighted, sodium thiosulfate was dissolved in water to prepare a sodium thiosulfate aqueous solution containing 50% by mass of sodium thiosulfate;

starch was added to a 10% by mass boric acid solution to form a mixed solution, and the mixed solution was added to the aqueous sodium thiosulfate solution (wherein the molar ratio of the added thiosulfate to hydrogen ion was 1:2), and the mixture was ultrasonically stirred until the reaction was completed, to give a nano-sulfur containing composition. The mass content of nano-sulfur in the obtained nano-sulfur containing composition was about 2.06%. The nano-sulfur containing composition prepared in this example contained sodium borate as a by-product, which can be used for disinfection and antisepsis of skin mucous membrane, and the treatment of tinea pedis, colpomycosis, inflammation, cervical erosion, bedsore, acne, external ear canal eczema, and herpes viral skin disease, and also can be used for the treatment of tumors, and also as a feed additive. In agriculture, boron-containing micronutrient fertilizers are effective for many crops, improving crop quality and raising production, so there is no need to remove it as taught by traditional prejudices, and the measured average particle size of sulfur was about 310 nm.

Example 11

This example provides a nano-sulfur containing composition, the raw materials of which comprise sodium thiosulfate, colloidal silica, salicylic acid, and water. The preparation method was as follows:

50 g of sodium thiosulfate and 10 g of colloidal silica were weighted, and sodium thiosulfate was dissolved in water to prepare a sodium thiosulfate solution containing 65% by mass of sodium thiosulfate; Colloidal silica was added to a 10% by mass salicylic acid solution to form a mixture, and the mixture was added to the aqueous solution of sodium thiosulfate (wherein the molar ratio of the added thiosulfate to the hydrogen ion was 1:2), and the system was ultrasonically stirred until the reaction was completed, to give a nano-sulfur containing composition. The nano-sulfur mass content in the obtained nano-sulfur containing composition was about 1.07%, and the nano-sulfur containing composition prepared in the example contained sodium salicylate as a by-product, which can be used in foods and medicines, and can also be used as a preservative. Therefore, there is no need to remove it as taught by traditional prejudices, and the measured average particle diameter of sulfur therein was about 40 nm.

Example 12

This example provides a nano-sulfur containing composition, the raw materials of which comprise sodium thiosulfate, gum arabic, lactic acid and water. The preparation method was as follows:

50 g of sodium thiosulfate and 2 g of gum arabic were weighed, and sodium thiosulfate was dissolved in water to prepare a sodium thiosulfate aqueous solution containing 65% by mass of sodium thiosulfate, gum arabic was added to a 10% by mass lactic acid solution to form a mixture, and then the mixture was added to the aqueous sodium thiosulfate solution (wherein the molar ratio of the added thiosulfate to hydrogen ion was 1:2), and the system was ultrasonically stirred until the reaction was completed, to give a nano-sulfur containing composition. The mass content of nano-sulfur in the obtained nano-sulfur containing composition was about 1.57%. The nano-sulfur containing composition prepared in the example contained sodium lactate as a by-product, which can be used as a moisturizing agent that is beneficial in skin and hair care products and medicines; sulfur has adverse side effects of causing dry skin and even causing peeling, while sodium lactate has a moisturizing effect, which solves the problem of dry skin. The preparation of nano-sulfur drugs and skin care products needs to, or even has to add a moisturizer to eliminate the adverse side effects of nano-sulfur, so there is no need to remove it as taught by traditional prejudices, and the measured average particle size of sulfur was 58 nm.

Example 13

This example provides a nano-sulfur containing composition, the raw materials of which comprise ammonium thiosulfate, pectin, lactic acid and water. The preparation method was as follows:

50 g of ammonium thiosulfate and 2 g of pectin were weighted, and ammonium thiosulfate was dissolved in water to prepare an ammonium thiosulfate aqueous solution containing 65% by mass of ammonium thiosulfate; pectin was added to a 10% by mass lactic acid solution to form a mixed solution, and the mixed solution was added to the ammonium thiosulfate aqueous solution (wherein the molar ratio of the added thiosulfate to the hydrogen ion was 1:2), and the system was ultrasonically stirred until the reaction was completed, to give a nano-sulfur containing composition. The nano-sulfur mass content in the obtained nano-sulfur containing composition was about 1.58%. The nano-sulfur containing composition prepared in the example contained ammonium lactate as a by-product, which is widely used in foods, beverages, dairy products, nutrient liquids, and medicines. etc., and can also be used as a feed additive, so there is no need to remove it as taught by traditional prejudices, and the measured average particle size of sulfur therein was about 71 nm.

Example 14

This example provides a nano-sulfur containing composition, the raw materials of which comprise sodium thiosulfate, glycol alginate, acetic acid, and water. The preparation method was as follows:

50 g of sodium thiosulfate and 2 g of glycolic acid alginate were weighted, and sodium thiosulfate was dissolved in water to prepare a sodium thiosulfate aqueous solution containing 65% by mass of sodium thiosulfate, then alginate was added to a 10% by mass acetic acid solution to form a mixed solution, then the mixed solution was added to the sodium thiosulfate aqueous solution (wherein the molar ratio of the added thiosulfate to hydrogen ion was 1:2).), and the system was ultrasonically stirred until the reaction was completed, to give a nano-sulfur containing composition. The mass content of nano-sulfur in the obtained nano-sulfur containing composition was about 1.21%, and the nano-sulfur containing composition prepared in this example contained sodium acetate as a by-product, which can be used as a buffering agent, a flavoring agent, and a fumet agent, and a pH adjuster, has certain anti-mold and anti-fungal effects, and can be used in skin and hair care products, so there is no need to remove it as taught by traditional prejudices, and the measured average particle size of sulfur was about 42 nm.

Example 15

This example provides a nano-sulfur containing composition, the raw materials of which comprise sodium thiosulfate, lignin, benzoic acid and water. The preparation method was as follows:

50 g of sodium thiosulfate and 5 g of lignin were weighed, and sodium thiosulfate was dissolved in water to prepare a sodium thiosulfate aqueous solution containing 65% by mass of sodium thiosulfate, lignin was added to a 10% by mass benzoic acid to form a mixture, the mixture was added to the sodium thiosulfate aqueous solution (wherein, the molar ratio of the added thiosulfate to hydrogen ion was 1:2), and the system was ultrasonically stirred until the reaction was completed, to give a nano-sulfur containing composition. The mass content of nano-sulfur in the obtained nano-sulfur containing composition was about 1.19%. The nano-sulfur containing composition prepared in this example contained sodium benzoate as a by-product, which is often used as a bactericide, a preservative, an antimicrobial agent and the like, and can be used in skin and hair care products, so there is no need to remove it as taught by traditional prejudices, and the measured average particle size of sulfur therein was about 230 nm.

Example 16

This example provides a nano-sulfur containing composition, the raw materials of which comprise sodium polysulfide ($Na_2S_2$), sodium carboxymethyl starch, lactic acid, and water. The preparation method was as follows:

50 g of sodium polysulfide and 2 g of sodium carboxymethyl starch were weighed, and sodium polysulfide was dissolved in water to prepare a sodium polysulfide aqueous solution containing 65% by mass of sodium polysulfide; sodium carboxymethyl starch was added to a 40% by mass lactic acid solution to form a mixed solution, and then the mixed solution was added to the sodium polysulfide aqueous solution (wherein, a molar ratio of the added polysulfide ion to hydrogen ion was 1:2), and the system was ultrasonically stirred until the reaction was completed, to give a nano-sulfur containing composition. The mass content of nano-sulfur in the obtained nano-sulfur containing composition was about 5.17%. The nano-sulfur containing composition prepared in this example contained sodium lactate as a by-product, which can be used as a moisturizing agent that is beneficial in skin and hair care products and medicines; sulfur has adverse side effects of causing dry skin and even causing peeling, which sodium lactate has a moisturizing effect, which solves the problem of dry skin. The preparation of nano-sulfur drugs and skin care products needs to, or even has to use moisturizers to eliminate the adverse side effects of nano-sulfur, so there is no need to remove it as taught by traditional prejudices.

Example 17

This example provides a nano-sulfur containing composition, the raw materials of which comprise potassium polysulfide ($K_2S_2$), guar gum, acetic acid, benzoic acid, and water. The preparation method was as follows:

50 g of potassium polysulfide and 2 g of guar gum were weighed, potassium polysulfide was dissolved in water to prepare a potassium persulfate aqueous solution containing 60% by mass of potassium polysulfate, guar gum was added to a complex acid solution of 20% by mass of acetic acid and benzoic acid (wherein the molar ratio of the added acetic acid to benzoic acid was 1:1) to form a mixed solution, and then the mixed solution was added to the potassium polysulfide aqueous solution (wherein the molar ratio of the added polysulfide ion to hydrogen ion was 1:2), and the system was ultrasonically stirred until the reaction was completed, to give a nano-sulfur containing composition. The mass content of nano-sulfur in the obtained nano-sulfur containing composition was about 2.79%. The nano-sulfur containing composition prepared in this example contained potassium lactate as a by-product, which can be used as a food preservative; an anti-microbial agent, mainly used in foods such as margarine, diluted margarine, wine, so there is no need to remove it as taught by traditional prejudices.

Example 18

This example provides a nano-sulfur containing composition, the raw materials of which comprise ammonium polysulfide (($NH_4)_2S_2$), agar, lactic acid and water. The preparation method was as follows:

50 g of ammonium polysulfide and 3 g of agar were weighed, and the ammonium polysulfide was dissolved in water to prepare an aqueous solution of ammonium polysulfide containing 50% by mass of ammonium polysulfide; agar was added to a 10% by mass lactic acid solution to form a mixed solution, and then the mixed solution was added to the aqueous solution of ammonium polysulfide (wherein the molar ratio of the added polysulfide ion to hydrogen ion was 1:2), and the system was ultrasonically stirred until the reaction was completed, to give a nano-sulfur containing composition. The mass content of nano-sulfur in the obtained nano-sulfur containing composition was about 1.60%, and the nano-sulfur containing composition prepared in the example contained ammonium lactate as a by-product, which is widely used in foods, beverages, dairy products, nutrient liquids, medicines, etc., and can also be used as a feed additive, so there is no need to remove it as taught by traditional prejudices, and the measured average particle size of sulfur therein was about 84 nm.

Example 19

This example provides a nano-sulfur containing composition, the raw materials of which comprise potassium thiosulfate, hydroxypropylcellulose, hydrochloric acid and water. The preparation method was as follows:

50 g of potassium thiosulfate and 2 g of hydroxypropylcellulose were weighed, and potassium thiosulfate was dissolved in water to prepare a potassium thiosulfate aqueous solution containing 65% by mass of potassium thiosulfate; hydroxypropylcellulose was added to a 40% by mass hydrochloric acid solution to form a mixed solution, and then the mixed solution was added to the potassium thiosulfate aqueous solution (wherein the molar ratio of the added thiosulfate to hydrogen ion was 1:2), and the system was ultrasonically stirred until the reaction was completed, to give a nano-sulfur containing composition. The mass content of the nano-sulfur in the obtained nano-sulfur containing composition was about 6.74%. The nano-sulfur containing composition prepared in this example contained potassium chloride as a by-product, which is a kind of potash fertilizer in agriculture, and the fertilizer effect thereof is fast, and can be directly applied to farmland to raise water in the lower layer of soil and have the effect of drought resistance, so there is no need to remove it as taught by traditional prejudices.

Example 20

This example provides a nano-sulfur containing composition, the raw materials of which comprise sodium thiosulfate, Span 20, citric acid, and water. The preparation method was as follows:
(1) 50 g of sodium thiosulfate was weighed and added to water to prepare a sodium thiosulfate aqueous solution containing 60% by mass of sodium thiosulfate;
(2) 20 g of corn oil, and 5 g of Span 20 were added, and stirred to form an oil-water emulsion;
(3) Then a 10% by mass citric acid solution was added (wherein the molar ratio of the added thiosulfate to hydrogen ion was 1:2), and the system was ultrasonically stirred until the reaction was completed, to give a liquid nano-containing sulfur composition, which was in a micro-emulsion state. The mass content of nano-sulfur in the obtained nano-sulfur containing composition was about 2.07%. The nano-sulfur containing composition prepared in this example also contained sodium citrate as a by-product, which is often used as a food additive and a preservative, and can also be added to skin and hair care products, so there is no need to remove it as taught by traditional prejudices, and the measured average particle size of sulfur therein was about 310 nm.

Example 21

This example provides a nano-sulfur containing composition, the raw materials of which comprise sodium thiosulfate, Tween 60, acetic acid, and water. The preparation method was as follows:
(1) 50 g of sodium thiosulfate was weighed and added to water to prepare a sodium thiosulfate aqueous solution containing 50% by mass of sodium thiosulfate;
(2) 20 g of castor oil, and 5 g of Tween 60 were added, and stirred to form an oil-water emulsion;
(3) Then a 30% by mass acetic acid solution was added (wherein the molar ratio of the added thiosulfate to hydrogen ion was 1:2), and the system was ultrasonically stirred until the reaction was completed, to give a liquid nano-sulfur containing composition, which was in a micro-emulsion state. The mass content of nano-sulfur in the obtained nano-sulfur containing composition was about 4.47%. The nano-sulfur containing composition prepared in this example further contained sodium acetate as a by-product, which can be used as a buffering agent, a flavoring agent and a fumet agent and pH adjuster, has a certain anti-mold and anti-fungal effect and can be used in skin and hair care products, so there is no need to remove it as taught by traditional prejudices.

Example 22

This example provides a pharmaceutical composition, which can be used for the treatment of scabies, tinea capitis, acne, seborrheic dermatitis, rosacea, pityriasis and chronic eczema and the like, the specific formulation thereof is as shown in Table 1 below.

TABLE 1

| Raw materials | Mass fraction % |
| --- | --- |
| Nano-sulfur containing composition prepared in Example 2 | 10 |
| Zinc oxide | 2 |
| Stearic acid | 14.0 |
| Glyceryl monostearate | 1.0 |
| Hexadecanol | 1.0 |
| White oil | 2.0 |
| Glycerin | 8.0 |
| KOH (100%) | 0.5 |
| Essence | proper amount |
| Deionized water | margin |

The preparation method of the pharmaceutical composition comprised: step (1): preparing a nano-sulfur containing composition according to Example 2; step (2): mixing the nano-sulfur containing composition prepared in the step (1) with the rest raw materials in Table 1.

Example 23

This example provides a pharmaceutical composition, which can be used for the treatment of scabies, tinea capitis, acne, seborrheic dermatitis, rosacea, pityriasis and chronic eczema and the like, the specific formulation thereof is as shown in Table 2 below.

TABLE 2

| Raw materials | Mass fraction % |
| --- | --- |
| Nano-sulfur containing composition prepared in Example 10 | 10 |
| Alum | 2 |
| Urea | 2 |
| White oil | 5.0 |
| Isononyl isononyl ester | 5.0 |
| Polysorbate oleate | 1.0 |
| Polysorbate | 1.0 |
| Polymethylmethacrylate | 2.0 |
| Sepigel 501 | 3.0 |
| Essence | proper amount |
| Deionized water | margin |

The preparation method of the pharmaceutical composition comprised: step (1): preparing a nano-sulfur containing composition according to Example 10; step (2): mixing the nano-sulfur containing composition prepared in the step (1) with the rest raw materials in Table 2.

Example 24

This example provides a vanishing cream, and the specific formulation thereof is shown in Table 3 below.

TABLE 3

| Raw materials | Mass fraction % |
| --- | --- |
| Nano-sulfur containing composition prepared in Example 6 | 3 |
| Stearic acid | 14.0 |
| Glyceryl monostearate | 1.0 |
| Hexadecanol | 1.0 |
| White oil | 2.0 |
| Glycerin | 8.0 |
| KOH (100%) | 0.5 |
| Essence | proper amount |
| Deionized water | margin |

The preparation method of the vanishing cream comprised: step (1): preparing a nano-sulfur containing composition according to Example 6; step (2): then mixing the nano-sulfur containing composition prepared in the step (1) with the rest materials in Table 3.

Example 25

This example provides a cold cream (skin cream), a kind of toiletries, and the specific formulation is shown in Table 4 below.

TABLE 4

| Cold cream formulation | Mass fraction % |
| --- | --- |
| Nano-sulfur containing composition prepared in Example 12 | 3 |
| Beeswax | 10.0 |
| White vaseline | 5.0 |
| White oil 18# | 45.0 |
| Water | 36.4 |

TABLE 4-continued

| Cold cream formulation | Mass fraction % |
| --- | --- |
| Borax | 0.6 |
| Essence, antioxidant | proper amount |

The preparation method of the cold cream comprised: step (1): preparing a nano-sulfur containing composition according to Example 12; and step (2): then mixing the nano-sulfur containing composition prepared in the step (1) with the rest materials in Table 4

Example 26

This example provides a moisturizer, a kind of toiletries, and the specific formulations are shown in Table 5 below.

TABLE 5

| | Mass fraction % | |
| --- | --- | --- |
| Moisturizer formulation | O/W | W/O |
| Nano-sulfur containing composition prepared in Example 7 | 3 | 3 |
| Almond oil | | 16.0 |
| Coco butter | | 5.0 |
| White oil | 10.0 | 20.0 |
| Vaseline | | 24.0 |
| Paraffin | 3.0 | |
| Beeswax | | 5.0 |
| Stearic acid | 3.0 | |
| Lanolin | 3.0 | |
| Arlacel P135 (polyethylene glycol (30) dipolyhydroxystearate) | | 4.0 |
| Tween-80 | 3.5 | |
| Span-80 | 1.5 | |
| Antioxidant | proper amount | proper amount |
| Essence | proper amount | proper amount |
| Deionized water | 73.0 | 23.0 |

The preparation method of the moisturizer comprised: Step (1): preparing a nano-sulfur containing composition according to Example 7; Step (2): then mixing the nano-sulfur containing composition prepared in the step (1) with the rest raw materials in Table 5.

Example 27

This example provides a moisturizing lotion, a kind of toiletries, and the specific formulation is shown in Table 6 below.

TABLE 6

| Raw materials | Mass fraction % |
| --- | --- |
| Nano-sulfur containing composition prepared in Example 15 | 3 |
| White oil | 5.0 |
| Isononyl isononyl ester | 5.0 |
| Polysorbate oleate | 1.0 |
| Polysorbate | 1.0 |
| Polymethylmethacrylate | 2.0 |
| Sepigel 501 | 3.0 |
| Essence | proper amount |
| Deionized water | 80.0 |

The preparation method of the moisturizing lotion comprised: (1): preparing a nano-sulfur containing composition according to Example 15; and step (2): mixing the nano-sulfur containing composition prepared in the step (1) with the rest raw materials in Table 6.

Example 28

This example provides a skin care gel/massage gel/cleansing gel/anti-acne gel in toiletries, and the specific formulations thereof are shown in Table 7 below.

TABLE 7

| Skin care gel formulation | Mass fraction % | | | |
|---|---|---|---|---|
| | Moisture gel | Message gel | Cleaning gel | Anti-acne gel |
| Nano-sulfur containing composition prepared in Example 12 | 3 | 3 | 5 | 4 |
| Octanoyl hydroxylated wheat protein | 0.5 | | | |
| Isononyl isononyl alcohol | 10.0 | | | |
| Isostaeryl isostearate | | | | 5.0 |
| Sepigel 98 | | | 3.0 | |
| Tween-20 | | 1.0 | | |
| Sepigel 305 | 3.0 | | | |
| Carbopol 941 | | | 0.9 | |
| Camphor | | | 0.2 | |
| Sodium lauroyl oat amino acid | | | 5.0 | |
| AESA (28%) | | | 7.5 | |
| Retinoic acid | | | | 0.5 |
| Isopropanol | | 10.0 | | |
| Triethanolamine | | 2.0 | 0.3 | |
| EDTA-Na | | | 0.1 | |
| Essence, pigment | proper amount | proper amount | proper amount | proper amount |
| Deionized water | 83.5 | 82.8 | 79.2 | 89.0 |

The preparation method of the skin care gel/massage gel/cleansing gel/anti-acne gel comprised: step (1): preparing a nano-sulfur containing composition according to Example 12; step (2): mixing the nano-sulfur containing composition prepared in the step (1) with the remaining raw materials in Table 7.

Example 29

This example provides a cleaning cream, and the specific formulation thereof is shown in Table 8 below.

TABLE 8

| Raw materials | Mass fraction % | |
|---|---|---|
| | O/W | W/O |
| Nano-sulfur containing composition prepared in Example 1 | 5 | 5 |
| Beeswax | 3.0 | |
| Paraffin | 10.0 | 10.0 |
| Cetyl alcohol | | 2.0 |
| Vaseline | 15.0 | 20 |
| White oil | 41.0 | 31 |
| Glyceryl monostearate | | 2.0 |
| Span-85 | 4.2 | |
| Tween-80 | 0.8 | 4.0 |
| Propylene glycol | | 5.0 |

TABLE 8-continued

| Raw materials | Mass fraction % | |
|---|---|---|
| | O/W | W/O |
| Essence | proper amount | proper amount |
| Deionized water | 21 | 22 |

The preparation method of the cleaning cream comprised: step (1): preparing a nano-sulfur containing composition according to Example 1; step (2): mixing the nano-sulfur containing composition prepared in the step (1) with the remaining raw materials in Table 8.

Example 30

This example provides a facial cleanser, and the specific formulation thereof is shown in Table 9 below.

TABLE 9

| Raw materials | Mass fraction % |
|---|---|
| Nano-sulfur containing composition prepared in Example 5 | 5 |
| White oil | 6.0 |
| Myristyl myristate | 2.0 |
| Isononyl isononanoate | 4.0 |
| Polysorbate oleate | 2.0 |
| Sepigel 501 | 8.0 |
| Propylene glycol | 2.0 |
| Essence | proper amount |
| Deionized water | margin |

The preparation method of the facial cleanser comprised: step (1): preparing a nano-sulfur containing composition according to Example 5; and step (2): mixing the nano-sulfur containing composition prepared in the step (1) with the rest raw materials in Table 9.

Example 31

This example provides a soap-based facial cleanser, and the specific formulation thereof is shown in Table 10 below.

TABLE 10

| Raw material | Mass fraction % |
|---|---|
| Nano-sulfur containing composition prepared in Example 11 | 5 |
| Stearic acid | 10.0 |
| Palmitic acid | 10.0 |
| Lanolin | 2.0 |
| Coconut oil | 2.0 |
| Glycerol monostearate | 2.0 |
| N-acyl-N-methyl taurate | 2.0 |
| Potassium hydroxide | 4.0 |
| EDTA disodium | 0.1 |
| Glycerin | 10.0 |
| Essence | 0.3 |
| Deionized water | margin |

The preparation method of the soap-based facial cleanser comprises: step (1): preparing a nano-sulfur containing composition according to Example 11; step (2): mixing the nano-sulfur containing composition prepared by the step (1) with the remaining materials in Table 10.

Example 32

This example provides a facial cleanser of surfactant type, and the specific formulation thereof is shown in Table 11 below.

TABLE 11

| Raw material | Mass fraction % |
| --- | --- |
| Nano-sulfur containing composition prepared in Example 14 | 5 |
| N-acyl-N-methyl taurate | 5.0 |
| POE-POP block copolymer | 5.0 |
| POE (15) oleyl alcohol ether | 21 |
| PEG-10 methyl glucoside | 12 |
| Jojoba oil | 2.0 |
| Lanonol | 1.0 |
| EDTA disodium | 0.1 |
| Glycerin | 8.0 |
| Sorbitol | 3.0 |
| Essence | 0.3 |
| Deionized water | margin |

The preparation method of the surfactant type cleanser comprised: Step (1): preparing a nano-sulfur containing composition according to Example 14; Step (2): mixing the nano-sulfur containing composition prepared in the step (1) with the rest materials in Table 11.

Example 33

This example provides a facial grinding cream/lotion, and the specific formulations thereof are shown in Table 12 below.

TABLE 12

| | Mass fraction % | |
| --- | --- | --- |
| Raw materials | Facial grinding cream | Facial grinding lotion |
| Nano-sulfur containing composition prepared in Example 9 | 5 | 5 |
| Stearic acid | 2.0 | 1.5 |
| White oil | 7.0 | 8.0 |
| Hexadecanol | 2.0 | 1.5 |
| Silicone oil | 2.0 | |
| Span-85 (Span 85) | 1.2 | 1.0 |
| Tween-80 | 2.8 | 1.5 |
| Carbopol-940 | 0.2 | 0.2 |
| Fatty alcohol polyoxyethylene ether succinate sulfonate | | 4.0 |
| Propylene glycol | 8.0 | |
| Triethanolamine | 0.2 | |
| Natural fruit stone powder | 3.0 | |
| Low molecular weight polyethylene (AC-P360) | | 4.0 |
| Antioxidant | proper amount | proper amount |
| Essence | proper amount | proper amount |
| Deionized water | 71.6 | 76.3 |

The method for preparing the facial grinding cream/lotion comprised: step (1): preparing a nano-sulfur containing composition according to Example 9; step (2): mixing the nano-sulfur containing compound prepared in step (1) with the rest raw materials in Table 12.

Example 34

This example provides a peeling mask, and the specific formulations thereof are shown in Table 13 below.

TABLE 13

| | Mass fraction % | |
| --- | --- | --- |
| Raw materials | Gelatinous | Paste |
| Nano-sulfur containing composition prepared in Example 11 | 5 | 5 |
| Polyvinyl alcohol | 10.0 | 15.0.0 |
| Polyvinylpyrrolidone | | 5 |
| Carbopol-941 | 0.5 | |
| Sepigel 305 | | 1.0 |
| Titanium dioxide | | 2.0 |
| Zinc oxide | | 2.0 |
| Propylene glycol | 5.0 | |
| Ethanol | 20 | |
| Triisopropanolamine | 0.5 | |
| 1,3-butanediol | | 5.0 |
| Protein hydrolysate | 5.0 | |
| Essence | proper amount | proper amount |
| Deionized water | margin | margin |

The preparation method of the peeling mask comprised: step (1): preparing a nano-sulfur containing composition according to Example 11; and step (2): mixing the nano-sulfur containing composition prepared in the step (1) with the rest raw materials in Table 13.

Example 35

This example provides a molding mask liquid (for oily skin or moisturizing), and the specific formulations thereof are shown in Table 14 below.

TABLE 14

| | Mass fraction % | |
| --- | --- | --- |
| Raw materials | For oily skin | For moisturizing |
| Nano-sulfur containing composition prepared in Example 12 | 5 | 5 |
| Glycerin | | 10.0 |
| Propylene glycol | | 3.0 |
| Hyaluronic acid | | 0.1 |
| Epidermal growth factor | proper amount | |
| Pearl hydrolysate | 0.5 | |
| Alkyl glycoside | 2.5 | |
| Essence | proper amount | proper amount |
| Deionized water | margin | margin |

The preparation method of the molding mask liquid comprised: step (1): preparing a nano-sulfur containing composition according to the Example 12; and step (2): mixing the nano-sulfur containing composition prepared in the step (1) and the rest raw materials in Table 14.

Example 36

This example provides a bath lotion, and the specific formulations thereof are shown in Table 15 below.

TABLE 15

| Raw materials | Mass fraction % | |
| --- | --- | --- |
| | Cool type | Easy flushing type |
| Nano-sulfur containing composition prepared in Example 1 | 5 | 5 |
| Fatty alcohol ether sulfate salt (70%) | 15.0 | |
| Dodecyl phosphate (30%) | | 38.0 |
| Lauric acid | | 11.0 |
| Fatty alcohol ether ether succinate sulfonate sodium sulfonate (35%) | 6.0 | |
| Hydroxy sulfobetaine (30%) | 4.0 | 8.0 |
| Polyethylene glycol-200 stearate | 3.0 | |
| Ethylene glycol distearate | | 3.0 |
| Thickener | | 1.5 |
| EDTA-4Na | | 0.1 |
| Propylene glycol | 4.0 | |
| Menthol | 1.0 | |
| KOH | | 3.2 |
| Essence | proper amount | proper amount |
| Deionized water | 67 | 35.2 |

The preparation method of the bath lotion comprised: step (1): preparing a nano-sulfur containing composition according to Example 1; step (2): mixing the nano-sulfur containing composition prepared in the step (1) and rest raw materials in Table 15.

Example 37

This example provides a shampoo in hair washing products, and the specific formulation thereof is shown in Table 16 below.

TABLE 16

| Raw materials | Mass fraction % |
| --- | --- |
| Nano-sulfur containing composition prepared in Example 9 | 5 |
| Sodium lauryl ether sulfate (70%) | 20.0 |
| Laurie acid diethanolamide | 4.0 |
| Ethylene glycol monostearate | 2.0 |
| Propylene glycol | 2.0 |
| Lanolin | 1.5 |
| Essence | 0.5 |
| Deionized water | margin |

The preparation method of the shampoo comprised: step (1): preparing a nano-sulfur containing composition according to Example 9; step (2): mixing the nano-sulfur containing composition prepared in the step (1) with the rest raw materials in the Table 16.

Example 38

This example provides paste shampoos in hair washing products, and the specific formulations thereof are shown in Table 17 below.

TABLE 17

| Raw materials | Mass fraction % | |
| --- | --- | --- |
| | 1 | 2 |
| Nano-sulfur containing composition prepared in Example 6 | 5 | 5 |
| Sodium decane sulfate | 20.0 | 25.0 |
| Lauric acid diethanolamide | | 3.0 |
| Stearic acid | 5.0 | 3.0 |
| Lanolin | 1.0 | 2.0 |
| NaOH (100%) | 1.0 | 0.4 |
| Sodium tripolyphosphate | 5.0 | 8.0 |
| Sodium bicarbonate | | 10.0 |
| Glycerin | 3.0 | |
| Pigment | proper amount | proper amount |
| Essence | 0.2 | 0.5 |
| Deionized water | margin | margin |

The preparation method of the paste shampoos comprised: Step (1): preparing a nano-sulfur containing composition according to Example 6; Step (2): mixing the nano-sulfur containing composition prepared in the step (1) with the rest raw materials in Table 17.

Example 39

This example provides hair creams in hair protecting products, and the specific formulations thereof are shown in Table 18 below.

TABLE 18

| Raw materials | Mass fraction % | |
| --- | --- | --- |
| | O/W | W/O |
| Nano-sulfur containing composition prepared in Example 12 | 2 | 2 |
| White oil | 33.0 | 53.4 |
| Ozocerite | | 2.0 |
| Beeswax | 3.0 | 5.0 |
| Hexadecanol | 1.3 | |
| Stearic acid | 1.0 | |
| Isopropyl lanolate | | 3.0 |
| Isopropyl myristate | | 2.0 |
| Borax | 0.2 | 0.6 |
| Triethanolamine | 1.5 | |
| Essence, antioxidant | proper amount | proper amount |
| Deionized water | margin | margin |

The preparation method of the hair care creams comprised: step (1): preparing a nano-sulfur containing composition according to Example 12; and step (2): mixing the nano-sulfur containing composition prepared in the step (1) with the rest raw materials in Table 18.

Example 40

This example provides a hair conditioner in hair protecting products, and the specific formulations thereof are shown in Table 19 below.

TABLE 19

| Raw materials | Mass fraction % | |
| --- | --- | --- |
| | 1 | 2 |
| Nano-sulfur containing composition prepared in Example 14 | 2 | 2 |
| Octadecyl chloride. Trimethylammonium | | 2 |
| Cetyl chloride. Trimethylammonium | 2 | |
| Dialkyl chloride. Dimethylammonium | 0.5 | |
| Silicone oil | | 1 |
| Glycerin | | 5 |
| Hexadecanol | 7 | 3 |
| Vaseline | 2 | |
| Polyoxyethylene sorbitan monostearate | | 1 |
| Polyoxyethylene sorbitan trioleate | 1 | |
| Polyoxyethylene sorbitan tristearate | 1 | |
| Glyceryl monostearate | 1.5 | |
| Polyoxyethylene alcohol | | 1.0 |
| Antioxidant | 0.03 | |
| Essence | proper amount | proper amount |
| Deionized water | margin | margin |

The preparation method of the hair conditioners comprised: Step (1): preparing a nano-sulfur containing composition according to Example 14; Step (2): mixing the nano-sulfur containing composition prepared in the step (1) with the rest raw materials in Table 19.

Example 41

This example provides a soap, which was obtained by adding a certain proportion of the nano-sulfur containing composition prepared in Example 1 during the process of producing the ordinary soap.

Specifically, this example provides a soap of the following formulation: 3% nano-sulfur containing composition prepared in Example 1, 1% essence, antioxidant (BHT 0.08%), 0.1% EDTA, pigment (little or absent), 1% super fatting agent (stearic acid), titanium dioxide (about 0.04% or no), about 13% water, and the rest was soap base. The above-mentioned raw materials were all dissolved by heating and stirring, and then cooled and molded to obtain the soap.

Example 42

The present example provides a farm chemical, which was obtained by adding the nano-sulfur containing composition prepared in Example 19 to the ordinary farm chemicals, which can be used to treat powdery mildew of crops and the like. It can also be self-provisioned by adding a synergist, other excipients, etc., on the basis of the liquid nano-sulfur containing composition of the present disclosure, and the prepared farm chemical can be appropriately diluted according to the specific circumstances, and then sprayed to the crops.

Example 43

The present example provides a feed, which can be obtained by directly adding the nano-sulfur containing composition prepared in Example 13 in ordinary feeds, thereby improving the disease resistance of the animals and the like.

Example 44

The present example provides a preservative for vegetable and fruit. The nano-sulfur containing composition prepared according to the Example 9 can be directly used as a preservative for vegetables and fruits. Specifically, it can be diluted as needed and directly used for preservation of vegetables and fruits.

The above Examples 22-44 merely exemplarily provide some sulfur containing products prepared by using the nano-sulfur containing composition prepared according to the concept of the present disclosure and preparation method thereof. And in the present disclosure, it is emphatically described that the nano-sulfur containing composition of the present disclosure is added into sulfur containing products such as pastes, lotions and creams, which specifically is to adding the nano-sulfur containing composition of the present disclosure into the existing or new formulations of the products and then stirring evenly, while it does not specifically define the order of the preparations of the nano-sulfur containing composition of the present disclosure and the basic toiletries or pharmaceutical compositions, there are no time priorities between the two steps.

Example 45

The inventor of the present disclosure was diagnosed with seborrheic dermatitis due to repeated redness, peeling and pain of the facial skin. After daubing the ointment prescribed by the doctor, the dermatitis was cured after a few days, but if the ointment was not used, it would recur about one or two weeks later. It has happened so many times and then went to see the doctor over and over again, but it wasn't cured.

At the same time, all the ointments prescribed by doctors were ointments containing hormones. The inventor was worried about the side effects of hormones. After the inventor checked the data, he found that sulfur ointments can treat seborrheic dermatitis, so he bought back sulfur ointments or creams. However, after using them, he found that these sulfur ointments had no effect. According to the inventor's research, the reason for this inefficacy was that the particle size of sulfur was too large to be absorbed by the skin to make use of its antifungal property. Even though there is about 5% content in the existing ointment, it has little effect, and it also makes the ointment have strong irritant smell, which is not in line with the actual needs.

Later, the inventor used his self-made nano-sulfur cream, in which the sulfur content could be only a few thousandths, but it worked very well. Moreover, the inventor used it for more than one year, and there was no side effect such as dry skin peeling.

In addition, for the same reason, the inventor had a large amount of dandruff, and the ordinary shampoo had no effect, such as Zinc pyrithione (ZPT)-containing, or coal tar-containing shampoo and other shampoo. The inventor also went to the doctor for help. The doctor (Canada) recommended ketoconazole shampoo. There was a similar product "Kangwang" in China. But after two or three years of using ketoconazole, it didn't work either. Later, shampoo containing selenium sulfide (not available in China before, but also available now) was used, which had some effect, but selenium sulfide was a highly toxic or highly toxic chemical substance, which should not be used more.

Now the inventor uses the self-made nano-sulfur shampoo (obtained by adding the nano-sulfur containing composition of the present disclosure into the existing shampoo), which has excellent effect, which has been used for more than one year, and has not found any adverse side effects, and basically avoids the generation of lots of dandruff.

The above embodiments are only for explaining the technical concept and features of the present disclosure, and are aimed to enable people who are familiar with the technology to understand the content of the present disclosure and implement it, and do not limit the scope of protection of the present disclosure. Any equivalent change or modification made according to the spirit of the present disclosure shall be covered in the scope of protection of the present disclosure.

The invention claimed is:

1. A preparation method of a sulfur-containing product, wherein the preparation method comprises the following steps:
    (1) providing a nano-sulfur containing composition comprising nano-sulfur, solvent(s) and anti-agglomerating agent(s) used for preventing or retarding agglomeration of the nano-sulfur by the following method (a) or (b), the nano-sulfur and anti-agglomerating agent(s) are dispersed in the solvent(s):
        (a) reacting thiosulfate(s) or polysulfide(s) with acid(s) in the presence of anti-agglomerating agent(s) in solvent(s) to obtain a nano-sulfur containing composition;
        (b) preparing a nano-sulfur containing composition by micro-emulsion method using thiosulfate(s) or polysulfide(s), and acid(s) as reaction raw materials and in the presence of anti-agglomerating agent(s) and solvent(s) to obtain a nano-sulfur containing composition;
    (2) mixing the nano-sulfur containing composition prepared by method (a) or method (b) directly without additional operations of removing anti-agglomerating agent(s) and/or byproducts with other components of a sulfur-containing product;
the sulfur-containing product is a toiletry for use on the surface of the skin on humans or animals, a drug for treating skin disorders, a drug for treating tumors, a drug for treating hair disorders, an agricultural chemical, a plant preservative for vegetable and fruits, an additive for animal feed, an additive for mold-prevention in paint, a mold prevention agent for textiles or textile mite-killing agents.

2. The preparation method according to claim 1, wherein the anti-agglomerating agent(s) is selected from a group consisting of thickener(s), suspending agent(s), dispersing agent(s), emulsion(s), binder(s), deflocculating agent(s), coupling agent(s), an antistatic agent(s), surfactant(s), and colloid(s).

3. The preparation method according to claim 2, wherein the thickener is any selected from a group consisting of natural thickener(s) and chemically synthesized thickener(s), wherein natural thickeners comprise starch, dextrin, acacia, carrageenan, pectin, agar, alginic acid and their salts or derivatives, tamarind gum, chitin, ablmoschus manihot gum, linseed gum, Sesbania gum, guargum, locust bean gum, xanthan gum; the chemically synthesized thickener(s) comprise sodium carboxymethyl starch, hydroxypropyl starch ether, sodium starch phosphate, acetyl distarch phosphate, phosphorylated distarch phosphate, and hydroxypropyl distarch phosphate.

4. The preparation method according to claim 2, wherein the suspending agent is selected from a group consisting of glycerin, syrup, gum suspension, plant polysaccharide suspension, cellulose suspension, carbopol, povidone, glucan, silicon bentonite, and thixotrope.

5. The preparation method according to claim 2, wherein the dispersing agent is selected from a group consisting of sodium silicate, sodium tripolyphosphate, sodium hexametaphosphate, sodium pyrophosphate, triethylhexylphosphoric acid, sodium lauryl sulfate, methyl amyl alcohol, cellulose derivative, polyacrylamide, guar gum, polyethylene glycol, and fatty acid polyethylene glycol ester.

6. The preparation method according to claim 2, wherein the surfactant is selected from a group consisting of double-chain ionic surfactant, anionic surfactant, cationic surfactant, and nonionic surfactant.

7. The preparation method according to claim 2, wherein the colloid is selected from a group consisting of silicic acid colloid, starch colloid, protein colloid, soybean milk, and colloidal silica.

8. The preparation method according to claim 1, wherein the anti-agglomerating agent is selected from a group consisting of starch, dextrin, gum arabic, carrageenan, pectin, agar, alginic acid, sodium alginate, alginic acid glycol ester, tamarind gum, chitin, ablmoschus manihot gum, linseed gum, Sesbania gum, guar gum, locust bean gum, xanthan gum, sodium carboxymethyl starch, hydroxypropyl starch ether, starch sodium phosphate ester, acetyl distarch phosphate, phosphorylated distarch phosphate, hydroxypropyl distarch phosphate, glycerin, syrup, carbopol, povidone, glucan, silicon bentonite, thixotrope, sodium silicate, sodium tripolyphosphate, sodium hexametaphosphate, sodium pyrophosphate, triethylhexylphosphoric acid, sodium lauryl sulfate, methyl pentanol, lignin, carboxymethyl cellulose, hydroxyethyl cellulose, hydroxypropyl cellulose, polyacrylamide, polyethylene glycol, fatty acid polyethylene glycol ester, sodium dioctyl sulfosuccinate, sodium dodecyl sulfonate, sodium dodecyl benzene sulfonate, cetyltrimethylammonium bromide, alkylphenol polyoxyethylene ether, silicic acid colloid, protein colloid, soybean milk, colloid silica, Span 20, Span 60, Span 80, Tween 20, Tween 60 and Tween 80.

9. The preparation method according to claim 1, wherein a mass ratio of the nano-sulfur to the anti-agglomerating agent in the nano-sulfur containing composition is 1-10:0.5-20.

10. The preparation method according to claim 1, wherein the solvent is selected from a group consisting of water, ethanol, propylene glycol, glycerin, and polyethylene glycol.

11. The preparation method according to claim 1, wherein in the nano-sulfur containing composition, mass content of the nano-sulfur is 0.01%-10%, mass content of the anti-agglomerating agent is 0.01-25%.

12. The preparation method according to claim 1, wherein the thiosulfate is selected from a group consisting of sodium thiosulfate, ammonium thiosulfate, and potassium thiosulfate; and/or, the polysulfide is selected from a group consisting of sodium polysulfide, potassium polysulfide, and ammonium polysulfide.

13. The preparation method according to claim 1, wherein the acid is organic acid, inorganic acid or a combination of organic acid and inorganic acid.

14. The preparation method according to claim 13, wherein the organic acid comprises benzoic acid, acetic acid, citric acid, tartaric acid, salicylic acid, lactic acid; and the inorganic acid comprises hydrochloric acid, sulfuric acid, nitric acid, and boric acid.

15. The preparation method according to claim 1, wherein the nano-sulfur has a particle diameter of 10 μm or less.

16. The preparation method according to claim 15, wherein the nano-sulfur has a particle diameter of 5 μm or less.

17. The preparation method according to claim 15, wherein the nano-sulfur has a particle diameter of 5 nm-3000 nm.

18. The preparation method according to claim 15, wherein the nano-sulfur has a particle diameter of 10 nm-2000 nm.

19. The preparation method according to claim 15, wherein the nano-sulfur has a particle diameter of 20 nm-500 nm.

* * * * *